July 8, 1958   M. A. ROBINSON   2,842,158
FLOAT VALVE
Filed June 18, 1956
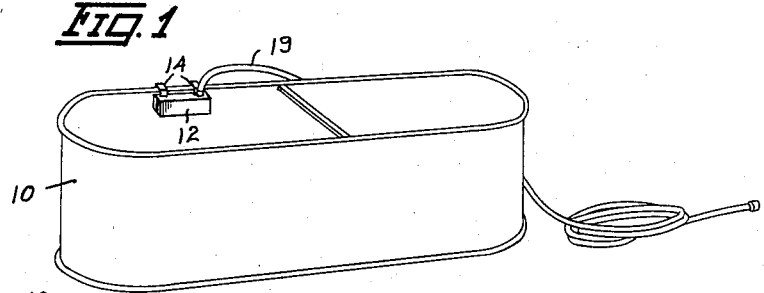
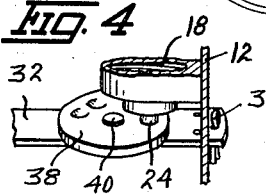
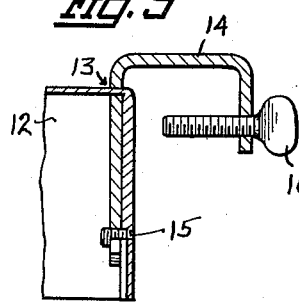
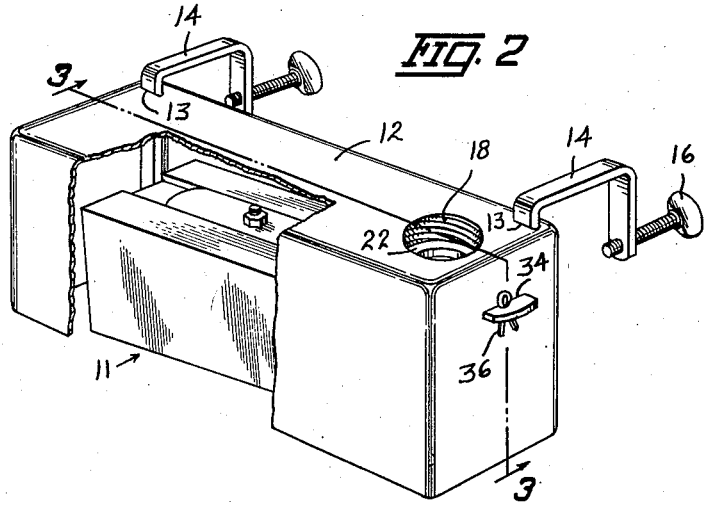
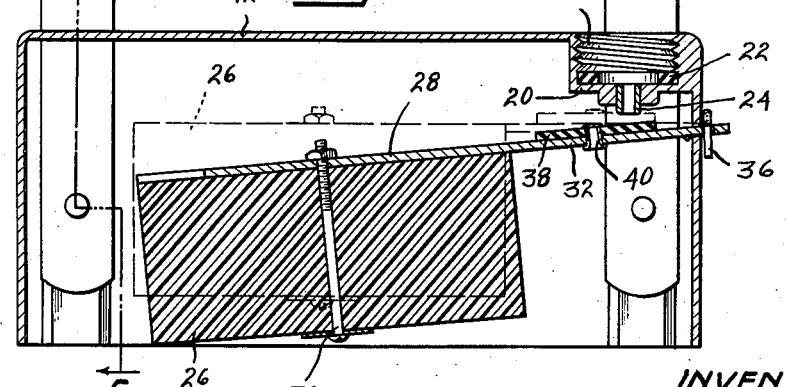
INVENTOR.
MARION A. ROBINSON
BY
ATTORNEY.

2,842,158
FLOAT VALVE

Marion A. Robinson, Clarion, Iowa

Application June 18, 1956, Serial No. 592,071

6 Claims. (Cl. 137—428)

My invention relates to improvements in float valves and this application is a continuation-in-part of my copending application filed May 26, 1954, Serial Number 432,353.

The float valve hereinafter disclosed has been designed more particularly for use in animal watering troughs and the like and to overcome certain drawbacks and disadvantages therein. A watering trough, for example, has generally been considered as requiring fixed piping from a water distribution system to supply water therefore. This is, of course, expensive and therefore one of the important objects contemplated by this invention is to provide a float valve designed particularly for connection to a garden hose.

Another object inherent in this invention is to provide a simple, easy and quick means for operably attaching the valve to a trough or tank or removing it therefrom.

I have also observed that float valves being of necessity disposed within a tank or trough are extremely vulnerable to damage from the animals that use the trough due to their repeated nudging against the same. As a result, such valves are frequently bent or otherwise jimmied out of proper operating condition so that they cease to efficiently perform their intended function, and thus a further aim of my invention is to provide a float valve for a watering trough or the like that is suitably shielded against contact by any source other than the water.

Still another object herein is to provide a float valve for the purpose indicated having a novel and extremely simplified valve assembly unit which utilizes a minimum number of parts and is for all practical purposes trouble free in operation and maintenance.

A further object of this invention is to provide a novel float valve that is economical in manufacture, durable in construction and efficient for its intended purpose.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

Fig. 1 is a perspective view of a watering trough showing my new float valve associated therewith, Fig. 2 is an enlarged perspective view illustrating a preferred embodiment of my invention with a portion cut away to more fully illustrate its construction, Fig. 3 is a longitudinal section view of this float valve taken on the line 3—3 of Fig. 2, Fig. 4 is an enlarged fragmentary perspective view showing the simplified valve assembly, and Fig. 5 is a cross sectional view taken on the line 5—5 of Fig. 3.

Referring to the drawings an animal watering trough 10 is shown to illustrate the use of this float valve although it will be understood that it is not intended to limit the use thereof to the specific illustration represented. The float valve assembly indicated generally at 11 is mounted within a suitable shield or cover 12 which I have preferably illustrated (Fig. 2) in the form of an elongated open bottom box-like member that is rectangular in cross section, but which may be of any other shape adapted to protect the float as will later appear. Spaced slots 13 in the top of cover 12 at one side thereof are formed to receive one side of an inverted U-shaped hook or bracket 14 that lies adjacent the inner wall of cover 12 and is held in place by any suitable means such as a screw 15. Thus attached, bracket 14 can be placed over the upper edge of trough 10 wherever desired to support the cover 12 and valve assembly 11 within the trough as shown in Fig. 1. Suitable screw means 16 are provided on each bracket 14 for tightening the same to the trough 10 in an obvious manner.

An internally threaded opening 18 is formed in the top of cover 12 near one end and is designed particularly for attachment to a standard fitting on a regular garden hose 19. Opening 18 terminates in the shoulder 20 which supports a suitable washer 22 and the reduced passageway in the form of a small fitting 24 passes through shoulder 20 into the interior of the cover 12 as shown in Fig. 3. Within the shield or cover 12 a float member 26 is mounted in depending relationship to a float arm 28. Any suitable type of float can be used and I have used a block of styrofoam which is attached to arm 28 by the bolt, washer and nut unit 30 and which provides an exceedingly simple and economical arrangement. However, the means of attaching the float to the float arm is immaterial and may be varied as desired. The float arm 28 has the integral portion 32 projecting beyond the float 26 and such portion 32 is passed through a slot 34 in the end wall of cover 12 near opening 18 just far enough to receive a cotter pin 36. Slot 34 is sufficiently large to allow a restricted vertical movement of the float 26 and is sufficiently close to the bottom plane of fitting 24 that a rubber gasket 38 mounted on float arm portion 32 will seat against fitting 24 when the float moves upwardly. In this respect it will be understood that as the water level in trough 10 goes down, float 26 will drop to the solid line position in Fig. 3 whereby water can float through opening 18 and fitting 24 since gasket 38 will not be seated on fitting 24. As the water level rises, float 26 will also rise so that gasket 38 seats against fitting 24 to shut off the flow of water. The above method of operation of a float valve is, of course, old and no invention is claimed therefor. However, the simplicity of construction of the float arm and its hinged connection to the cover 12 as described is a decided improvement over previous structures of a like nature.

It is pointed out that repeated contacts of the gasket 38 against the fitting 24 may eventually result in wear and possibly a reduction in the effectiveness of the closure necessary at this point. Normally this would require a change in gaskets but to increase the usefulness of my gasket 38 I have mounted it to the float arm portion 32 by means of a pin 40 on which it can be manually rotated to allow the area of contact with fitting 24 to be changed as needed (Fig. 4). Thus the life of the gasket is considerably increased and the time interval in which a replacement must be made is substantially increased.

Another advantage of this float resides in the use of shield 12. Float assemblies per se have long been used as pointed out previously, but they are generally unshielded so as to be extremely vulnerable to damage by animals nudging against them. Such nudging is a common source of requiring repairs and replacements of float assemblies so that frequently the normal useful life of such equipment is materially shortened. By shielding the float, however, preferably on all sides except the bottom, the float is not subject to contact by any source except the water.

Brackets 14 adapt this float to easy and quick mounting at any desired point along the edge or rim of the trough 10. Similarly they enable the speedy transfer of the float from one trough or tank to another so that more than one trough can be employed at different places without requiring a permanent water line laid to any of them. While the detachability of a float valve to a trough 10 is deemed novel for the purposes indicated, the physical nature of the attaching means may be varied widely from the particular construction shown. For example, brackets 14 may be integrally formed with the trough 10 or other suitable clamping means may be employed.

It is also pointed out that while I prefer an open bottom type of box shield, such is not in any sense critical to this invention for the shield is primarily a protective member for the float and this can be accomplished by other means such as a squirrel cage, a foraminous box, bars or straps, a cross-work of bars or other appropriate structure.

In spite of the considerable length of time that both garden hoses and float valves have been in everyday usage, I believe that I am the first to have conceived the idea of adapting a float valve for the purpose indicated so that it may be screwed directly onto the male end of a garden hose whereby the utility of the float valve may be employed on a watering trough without requiring a fixed water installation running to the trough.

The use of my float valve with a garden hose provides an easily movable source of water supply which is of great advantage to farmers. For example, a farmer raising swine finds it highly desirable to shift his watering trough from place to place in order to avoid the development of a large mud hole. Also, in the feeding of both hogs and cattle, it is desirable from time to time to move them from one lot to another in order to avoid diseases or for better feeding facilities. To have a separate watering system for each location or to haul water from place to place is not too practical nor economical and thus by the use of my float valve and hose combination, the water supply problem is exceedingly simplified.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A float valve, comprising, a shield member, means communicating with the interior of said shield member for operable connection to one end of a garden type hose, one side of said shield member having a slot, a float arm within said shield member, said arm having a portion thereof projecting through said slot with its major length disposed within said shield member, the side of said shield member defining said slot serving as a hinge means to allow vertical hinge motion of said float arm within said shield member, means on the projecting portion of said float arm to hold it against displacement from said slot, a float on said float arm, and means on said float arm engageable at times with said first mentioned means for closing the same.

2. A float valve, comprising, a shield, means communicating with the interior of said shield for operable connection to one end of a water supply line, a float arm within said shield, said arm having a minor portion thereof projecting through one side of said shield for a vertical hinge movement relative thereto, said side of said shield being the only means of support for said float arm, a float on said float arm, and means on said float arm engageable at times with said first mentioned means for closing the same.

3. In a float valve construction, an improved means for providing a hinge action on a float arm, comprising in combination with a shield member having a valve means associated therewith, a float arm having a minor portion thereof projecting through said shield member, said shield member being the only supporting means for said float arm, the major length of said float arm capable of a hinge movement relative to said shield member with said shield member serving as the hinge point, means on said float arm to hold it against displacement from said shield member, and means operatively associating said float arm with said valve means.

4. A float valve, comprising an open bottom box-like shield, means communicating with the interior of said shield for operable connection to one end of a water supply line, a float arm within said shield, said arm having a minor portion thereof projecting through one side of said shield for a vertical hinge movement relative thereto with said side of said shield being the only means of support for said float arm and serving as the hinge point therefor, a float on said float arm, means on said float arm engageable at times with said first mentioned means for closing the same, and means for readily attaching and detaching said shield to and from any edge of a container.

5. A float valve, comprising a box-like open bottom shield, means communicating with the interior of said shield for operable connection to one end of a water supply line, one side of said shield having a slot, an elongated float arm having a minor portion of its length projecting through said slot to the outer side of said shield with its major length disposed within said shield, the side of said shield defining said slot serving as a hinge means to allow vertical hinge motion of said float arm within said shield, means on said float arm outside of said shield to hold it against displacement from said slot, a float on said float arm, means on said float arm engageable with said first mentioned means for closing the same, and said side of said shield having said slot being the only means of support for said float arm and float thereon.

6. A float valve, comprising a box-like open bottom shield, said shield having an opening adapted for communication with a water supply line, a float arm disposed within said shield for a hinge movement relative thereto and engageable with said opening to open and close the same, said hinge movement consisting of a minor length of said float arm projecting through a side of said shield and a pin disposed transversely of said float arm on the outer side of said shield whereby the side of said shield is the only supporting means for said float arm.

References Cited in the file of this patent

UNITED STATES PATENTS

| 107,448 | Chandler | Sept. 20, 1870 |
| 525,870 | Stevens | Sept. 11, 1894 |
| 1,099,800 | Helgerson | June 9, 1914 |
| 1,463,907 | Olson | Aug. 7, 1923 |
| 1,489,403 | Wasdell | Apr. 8, 1924 |
| 2,059,359 | Karges | Nov. 3, 1936 |
| 2,433,166 | Smith | Dec. 23, 1947 |
| 2,606,572 | Arnold | Aug. 12, 1952 |
| 2,684,077 | Shaffer | July 20, 1954 |